No. 806,710. PATENTED DEC. 5, 1905.
C. PFEIFFER.
RAKE.
APPLICATION FILED APR. 27, 1905.
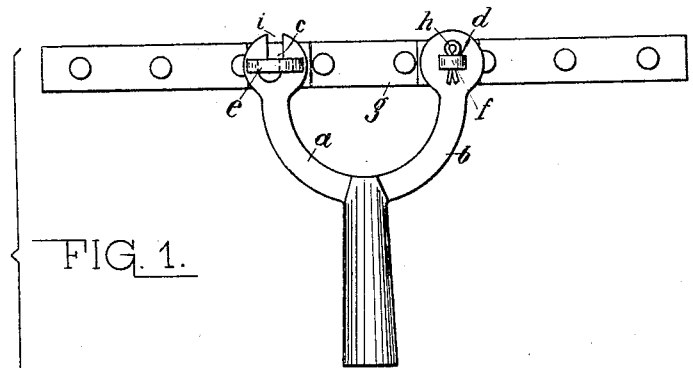
FIG. 1.
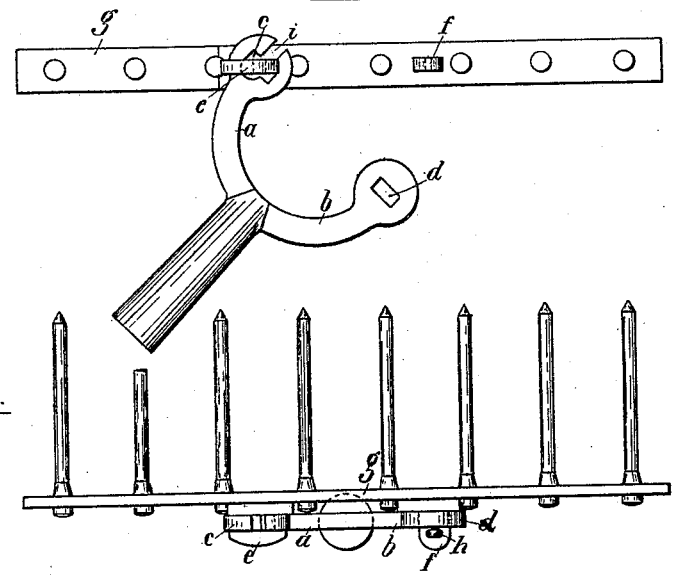
FIG. 2.
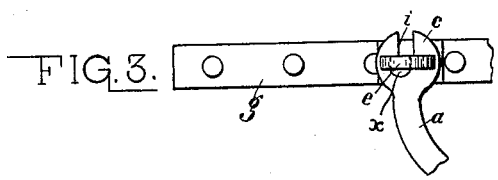
FIG. 3.
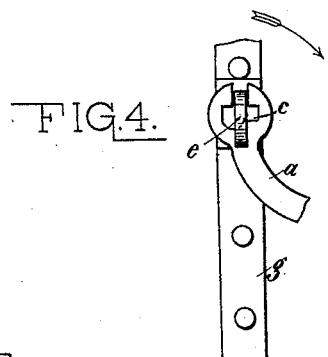
FIG. 4.
FIG. 5.
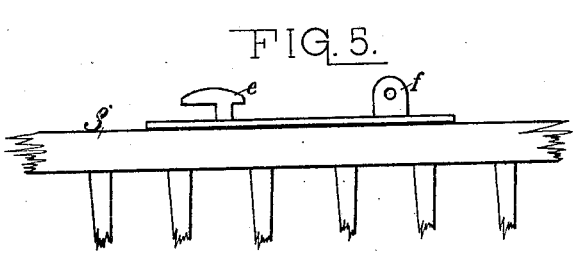
FIG. 6.
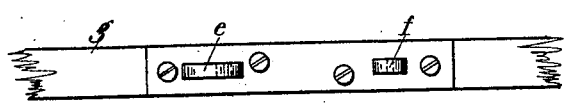
Witnesses:
Geo. Heinicke
F. Dittmar
Inventor:
Carl Pfeiffer
by G. Dittmar
Attorney

UNITED STATES PATENT OFFICE.

CARL PFEIFFER, OF JENA, GERMANY.

RAKE.

No. 806,710.     Specification of Letters Patent.     Patented Dec. 5, 1905.

Application filed April 27, 1905. Serial No. 257,777.

*To all whom it may concern:*

Be it known that I, CARL PFEIFFER, a subject of the German Emperor, residing at Jena, Saxe-Weimar, Germany, have invented certain new and useful Improvements in Rakes, of which the following is a full, exact, and clear specification.

The present invention relates to rakes with interchangeable prong-bars, so that the same handle may be used for a rake with prongs standing wide apart and may be readily changed for a bar with prongs leaving narrow spaces. To this end the prong-bar is provided with two projections or tenons of special form which can be readily inserted into suitable openings at the end of the fork of the handle.

In the accompanying drawings, forming part of this specification, Figure 1 shows a rake in plan view. Fig. 2 is an end elevation of the same. Fig. 3 illustrates the connection of the handle with the prong-bar at one end of the latter, and Fig. 4 shows these parts in the position of assembling. Fig. 5 shows the prong-bar in elevation separately with its two projections or tenons, and Fig. 6 is a plan view thereof.

The fork ends $a$ and $b$ of the handle are provided with openings $c$ and $d$, adapted to receive the tenons $e$ and $f$ of the different prong-bars, which may be interchanged. The tenon $e$ is T-shaped and rests in a slot of the arm $a$ of particular shape, so as to retain the prong-bar in place when properly turned into position. The tenon $f$ of the other end of the bar $g$ is flat and of rectangular cross-section, fitting into a rectangular hole $d$ at the end of the arm $b$, and is secured therein by a cotter-pin $h$, passing through a round hole.

The opening in the arm $a$ consists in an open slot $i$ with a cross-cut of approximately the width of the web of the tenon $e$. One corner formed by this cross-slot is cut out and rounded, as shown in Fig. 3, and marked by the letter $x$. In inserting one of the bars $g$ the T-shaped tenon $e$ is placed into the slot $i$, as shown in Fig. 4. Then the bar is turned for ninety degrees in the direction of the arrow, Fig. 4. The edge of the web slides thereby into one end of the cross-cut, while the opposite edge is allowed by the recess $x$ to turn into the opposite end of said cross-cut. When the bar $g$ is thus in the position shown in Fig. 3, it is solidly connected with the arm $a$ of the handle. The tenon $f$ is now pushed through the rectangular opening $d$ of the arm $b$ and secured therein by a cotter-pin.

It will be understood from the above that the bars $g$ are firmly held in the ends $a$ $b$ of the handle and that for interchanging the same it is only necessary to take out the cotter-pin, whereupon the prong-bar can easily be turned into a position to be renewed.

Having thus described my invention, what I claim is—

Rake with interchangeable prong-bar composed of a forked handle having at one of the ends of the fork a rectangular perforation $d$, and at the other hand an open slot $i$ with a cross-cut and a rounded recess $x$, and of a prong-bar with a flat rectangular projection $f$ having a cotter-pin hole near one end and with a T-shaped tenon near the other end, the first adapted to fit the rectangular perforation at one of the forked ends of the handle, the latter to fit the slot $i$ with cross-cut, substantially as described and for the purpose set forth.

In testimony whereof I affix my signature.

CARL PFEIFFER

In presence of—
  F. STEPHAN,
  CHARLES NEUER.